June 13, 1950 G. B. WOOD 2,511,556
MECHANICAL PACKING DEVICE FOR DUMP TRUCKS
Filed Sept. 20, 1948 5 Sheets-Sheet 1
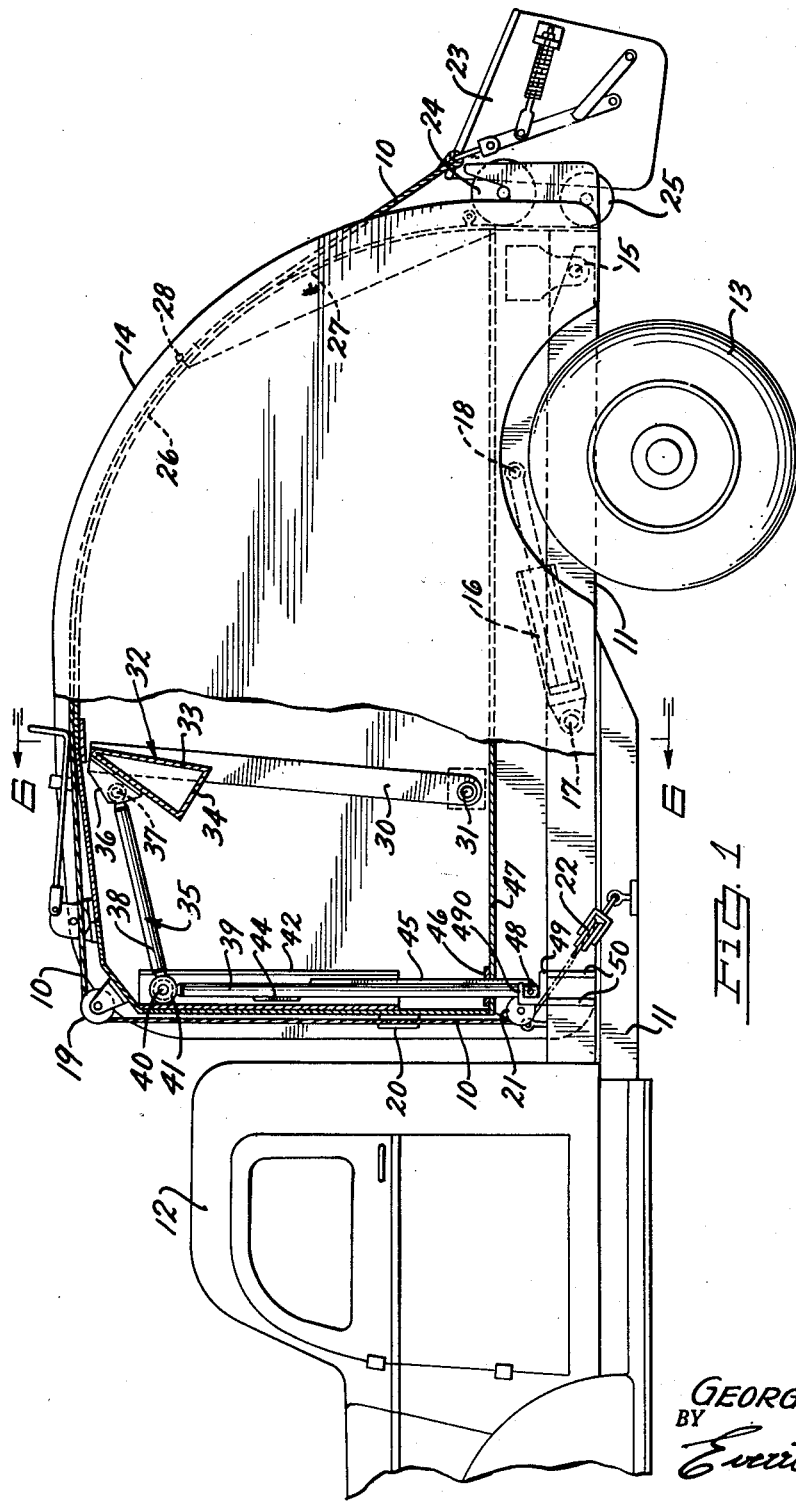
INVENTOR.
GEORGE B. WOOD
BY
Everett H. Wright
ATTORNEY

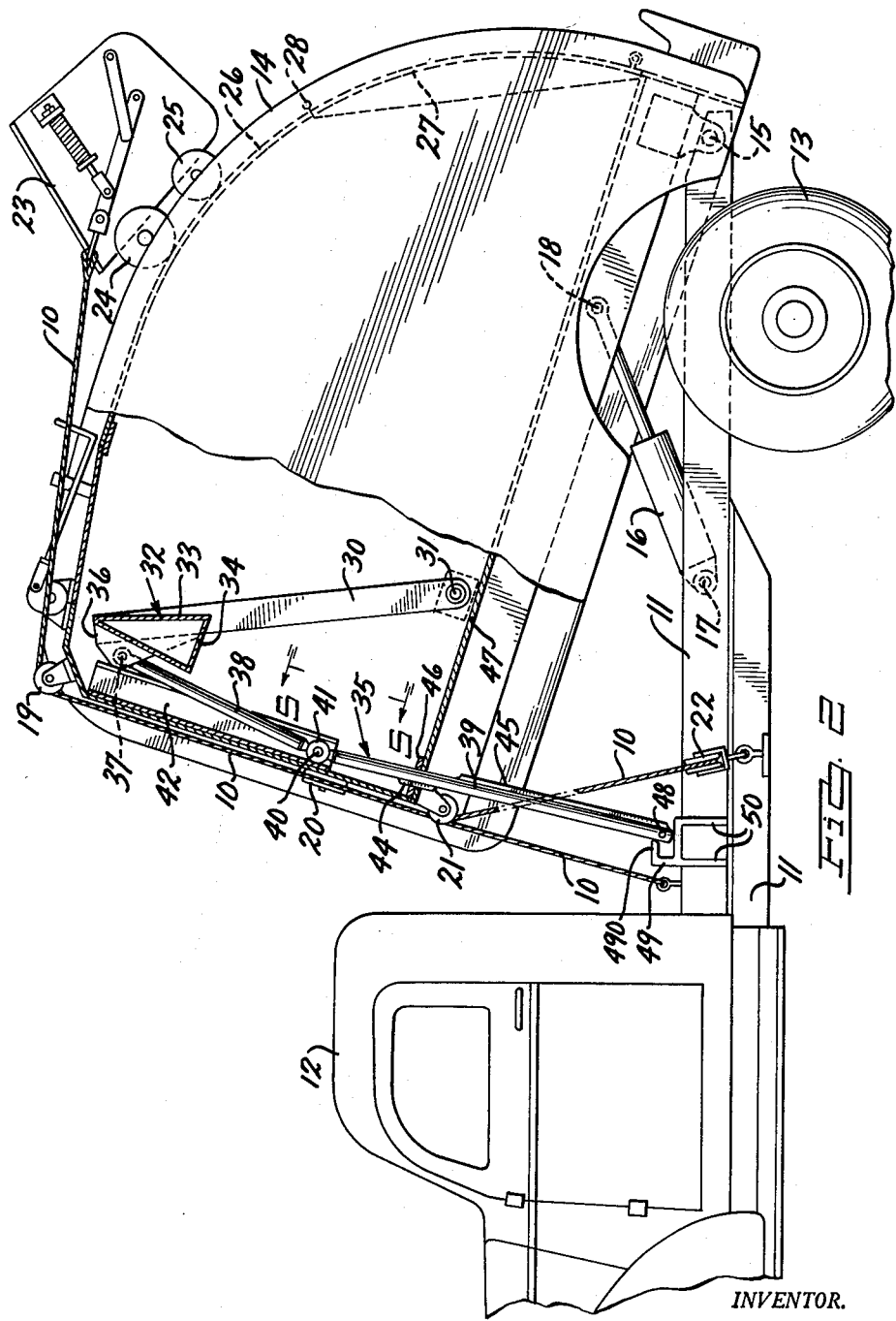

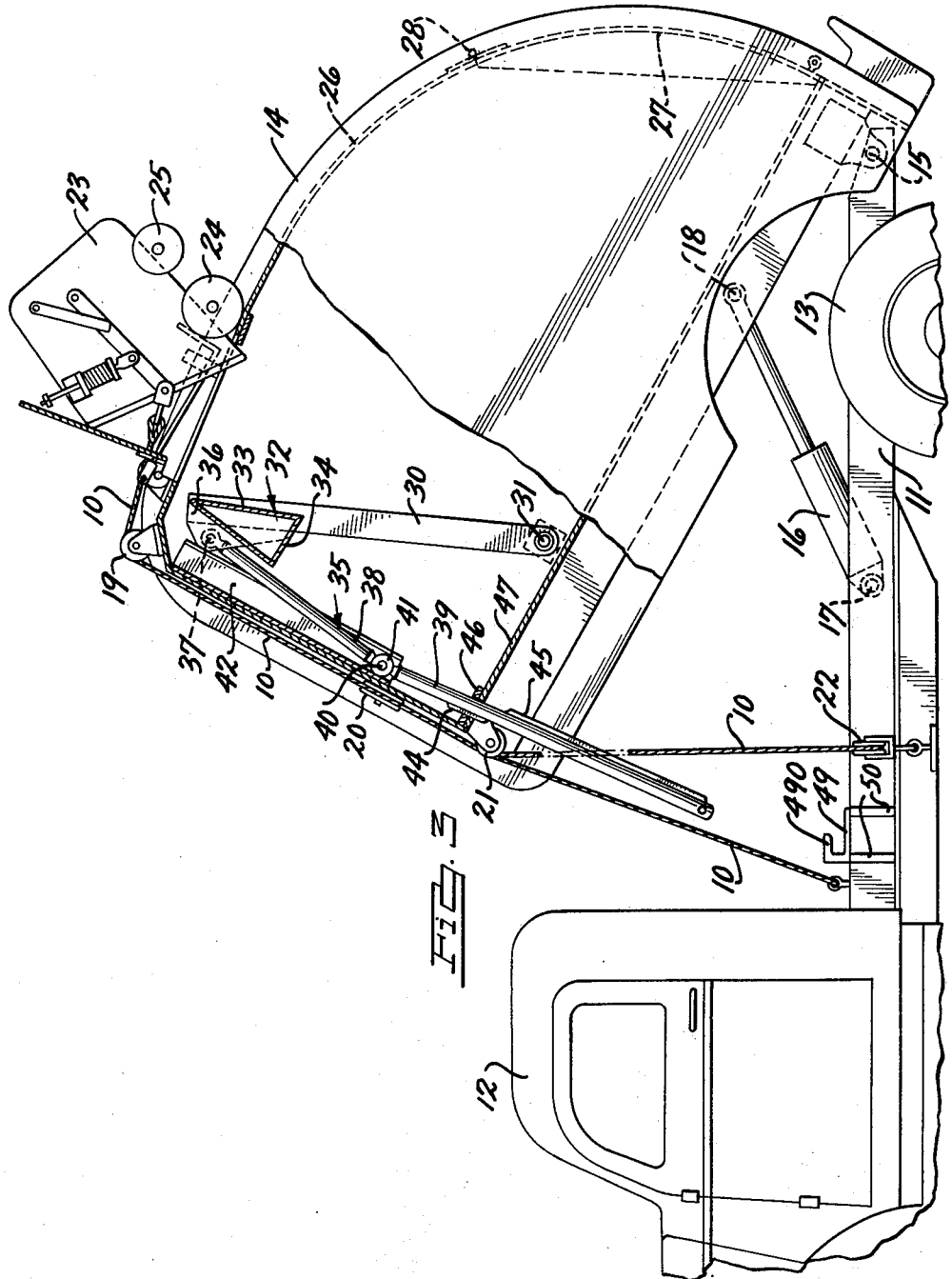

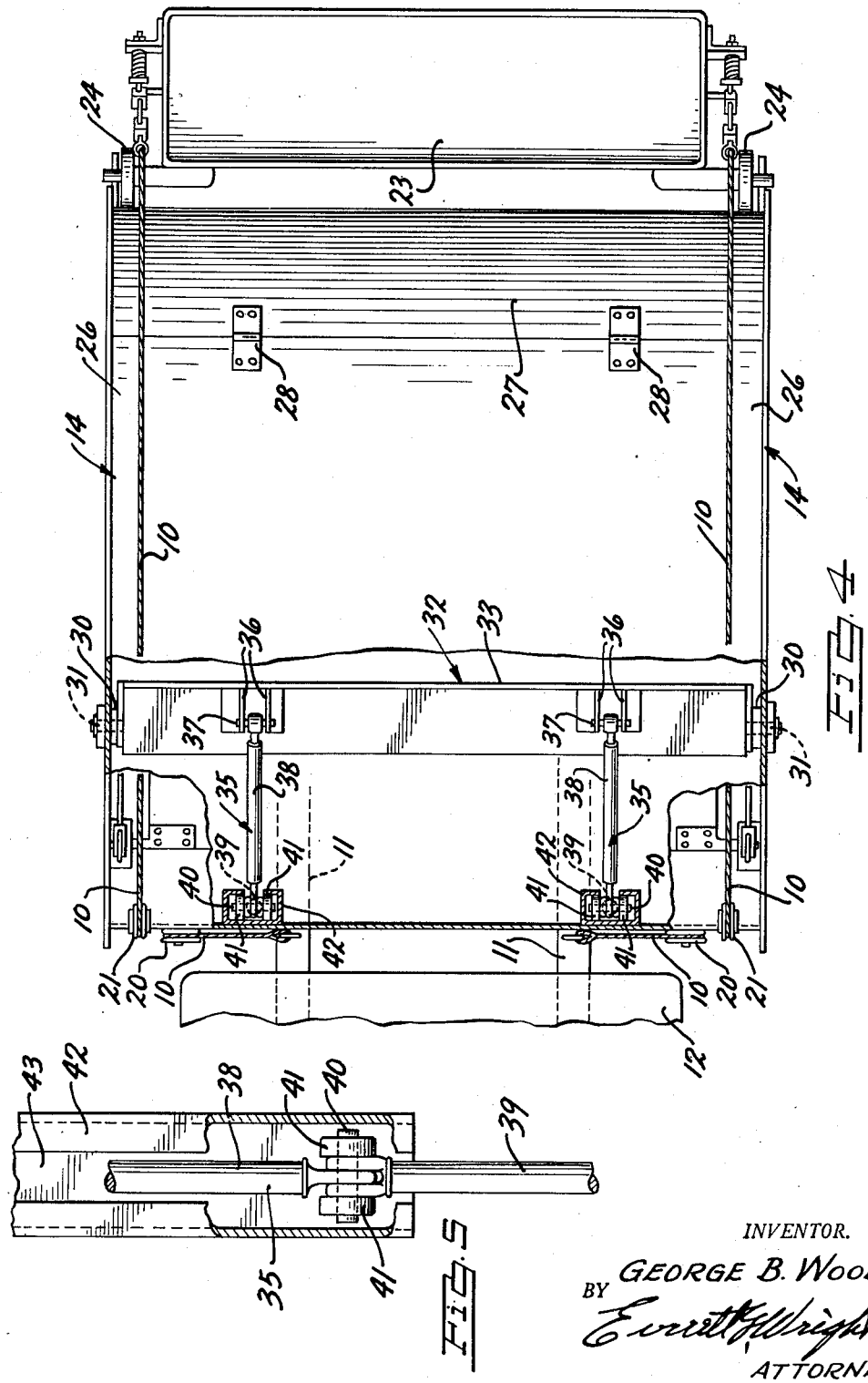

June 13, 1950 G. B. WOOD 2,511,556
MECHANICAL PACKING DEVICE FOR DUMP TRUCKS
Filed Sept. 20, 1948 5 Sheets-Sheet 5
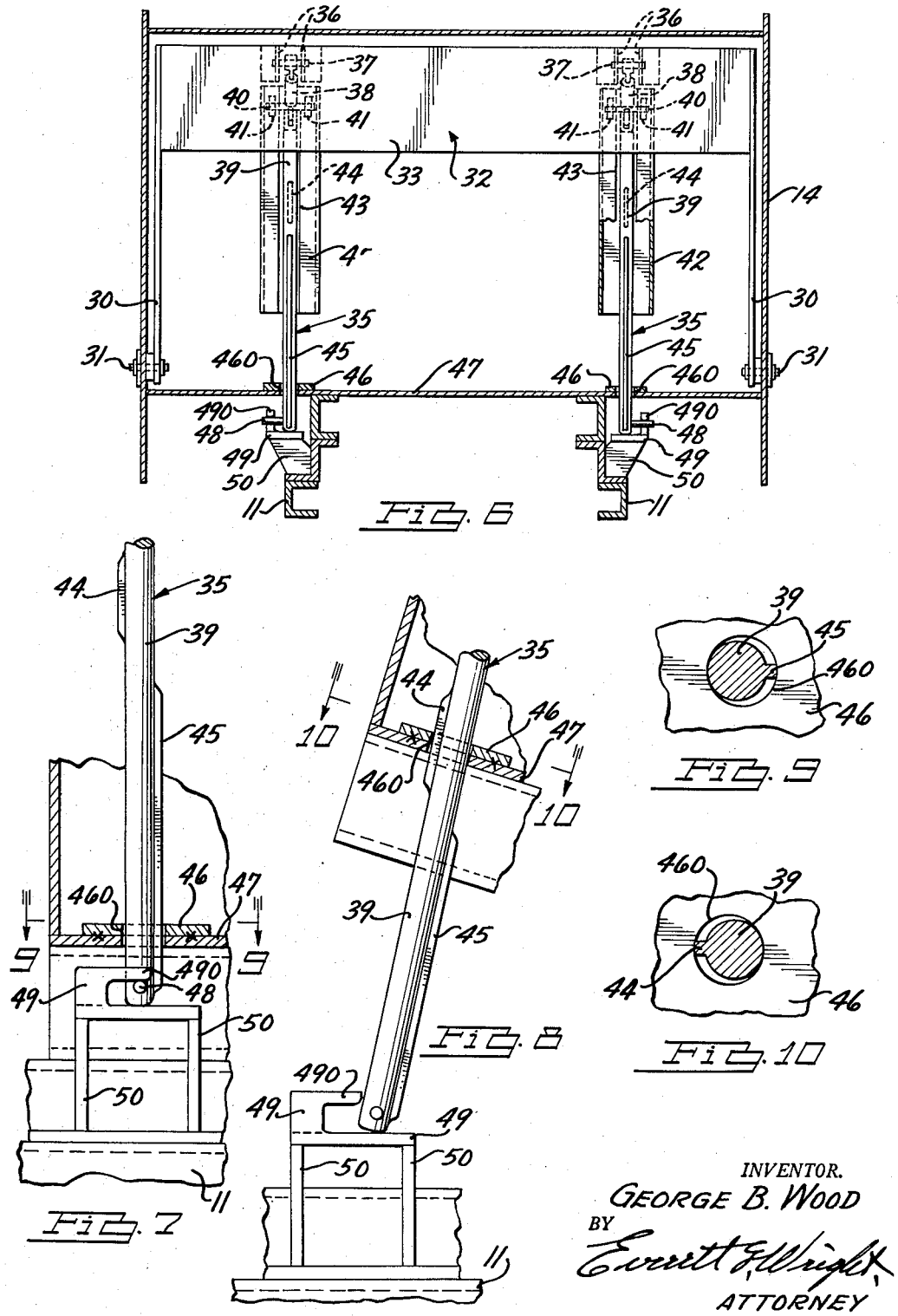
INVENTOR.
GEORGE B. WOOD
BY
Everett G. Wright
ATTORNEY Patented June 13, 1950

2,511,556

UNITED STATES PATENT OFFICE 2,511,556

MECHANICAL PACKING DEVICE FOR DUMP TRUCKS

George B. Wood, Detroit, Mich.

Application September 20, 1948, Serial No. 50,087

18 Claims. (Cl. 214—67)

This invention relates to mechanical packing devices for packing rubbish and refuse into dump truck bodies of the enclosed or substantially enclosed type.

A large percentage of haulage capacity of enclosed type dump trucks is normally wasted due to the fact that it is not possible to fill the dump truck and pack the load to capacity. This is particularly true of dump trucks of a mechanical loading type which are employed in rubbish, garbage and other refuse pick-up operations. In a majority of refuse and rubbish pick-up operations, a mechanical loading device in the form of a bucket is employed on a rearwardly tilting type dump body, which loading device travels from the rear of the dump body to the top thereof and automatically discharges the rubbish or refuse into the dump body through a hatch at the top thereof. As the dump body is being filled, the rubbish or refuse slides toward the rear of the dump body. However, the rubbish or refuse is generally bulky, full of voids and has a rather flat angle of repose. This causes the dump body to appear to be filled to capacity, when, as a matter of fact, ofttimes the dump body is only filled from one-half to three-quarters of its capacity.

With the foregoing in view, the primary object of this invention is to provide a simple, effective and inexpensive mechanical packing device for self-loading dump bodies of rubbish and refuse trucks and the like which increases the capacity of the body by assuring a properly and thoroughly compacted load.

Another object of the invention is to provide an improved mechanical packing device for self-loading dump bodies for rubbish and refuse trucks of the type which employs a loading bucket which travels to the top of the dump body responsive to the tilting of the dump body to its tilted position, the said packing device operating responsive to the return of the dump body from its rearwardly tilted position to its normal horizontal position.

Another object of the invention is to provide an improved mechanical packing device for self-loading dump bodies which operates automatically each time the dump body is tilted for loading and which is more effective as the dump body becomes more fully loaded, thus assuring maximum compactness of the material in the dump body.

Another object of the invention is to provide, in combination with a self-loading truck dump body of the type which is power tilted to load, a fully automatic device which compacts material loaded into the dump body during the return of the dump body to its normal position after each time it is tilted for loading responsive to the gravity return of the dump body to its normal position.

Other objects of the invention will be apparent by reference to the following detailed description taken in connection with the accompanying drawings; in which:

Fig. 1 is a fragmentary side elevational view of a self-loading dump truck showing the dump body and loading bucket thereof in their normal position, a portion of the dump body being broken away showing a mechanical packing device embodying the invention at the end of its compacting stroke.

Fig. 2 is a view similar to Fig. 1 except that the dump body is partially tilted, the loading bucket is partially elevated, and the mechanical packing device embodying the invention is fully retracted.

Fig. 3 is a view similar to Figs. 1 and 2 except that the dump body is fully tilted, the loading bucket is fully elevated and dumped, and the mechanical packing device embodying the invention is fully retracted.

Fig. 4 is a fragmentary top plan view of the truck and dump body with portions thereof broken away to show the compactor of the mechanical packing device embodying the invention at the end of its compacting stroke.

Fig. 5 is an enlarged detailed view of the trunnioned joint of a compactor push arm assembly positioned in its hollow track.

Fig. 6 is a transverse sectional view taken on the line 6—6 of Fig. 1.

Fig. 7 is an enlarged fragmentary view showing a compactor push arm urged by its anchoring cam in anchored relationship to the compactor push arm anchorage fixed to the truck frame.

Fig. 8 is an enlarged fragmentary view similar to Fig. 7 except that the dump body is partially lifted and the compactor push arm is urged by its release cam into released relationship with respect to the push arm anchorage fixed to the truck frame.

Fig. 9 is a fragmentary cross sectional view taken on the line 9—9 of Fig. 7.

Fig. 10 is a fragmentary cross sectional view taken on the line 10—10 of Fig. 8.

Referring now to the drawings wherein like reference numerals refer to like and corresponding parts throughout the several views, the particular illustrative embodiment of the invention is disclosed in connection with a dump truck having a frame or chassis 11, a cab 12, traction wheels 13 and a dump body 14 pivoted to the chassis 11 on pivots 15 and lifted responsive to a hydraulic cylinder 16 pivoted at 17 to the chassis 11 and pivoted at 18 to the dump body 14. Suitable hoisting cables 10 and sheaves 19, 20, 21 and 22 cause the loading bucket 23 to travel on its wheels 24 and 25 along the side of the upper curved top 26 of the dump body 14 from its Load position shown in Fig. 1 to its Dump position shown in Fig. 3 where the loading bucket 23 empties into the dump body 14, all responsive to the rearward tilting of the dump body 14 from its normal position shown in Fig. 1 to its maximum rearward tilt position shown in Fig. 3. In its maximum rearward tilt or dump position shown in Fig. 3, the dump body may be dumped by releasing the normally latched door 27 thereof so that it can swing about the door hinges 28.

Inside the dump body 14 is pivoted on each side thereof a compactor arm 30 which swings on suitable pivots 31 disposed through the sides of the said dump body 14. Between the compactor arms 30 and rigidly fixed thereto is a transversely disposed compactor 32 having a compactor face 33 and an upwardly and rearwardly disposed strike plate 34. A pair of compactor push arms 35 are pivoted to the rear of the compactor 32 by means of a gusset 36 and pivots 37.

The compactor push arms 35 are each composed of an upper push arm 38 and a lower push arm 39 hingedly connected together by a pivot 40 on which trunnions 41 are rotatably mounted. The trunnions 41 travel in a hollow track 42 welded or otherwise secured to the inside of the front wall of the dump body 14, the said hollow tracks 42 having a slot 43 in the forward face thereof to accommodate the lower push arms 39. Each lower push arm 39 is provided with a release cam 44 and a locking cam 45 which alternately engage the apertured cam plate 46 secured to the floor 47 of the dump body 14 to urge the lower push arm 39 forwardly and rearwardly respectively as the dump body 14 is raised and lowered so that the laterally disposed anchor pin 48 on each lower push arm 39 near the lower end thereof engages a push arm anchorage 49 secured to the dump truck frame or chassis 11 by means of a suitable bracket 50. It will be noted that the cam plate 46 and the floor 47 to which the cam plate 46, is welded are provided with an aperture 460 to accommodate the lower push arm 39 and one or the other of the release cam 44 and the locking cam 45.

The particular embodiment of the invention disclosed for the purpose of illustration operates without any application of special power to the compactor 32. When the dump truck body 14 is in its normal or Load position as shown in Fig. 1, the compactor 32 has completed a compaction stroke and the lower push arms 39 are anchored into the push arm anchorages 49 with the anchor pin 48 on each of the lower push arms 39 engaged under the hook 490 of each of the said anchorages 49.

Whenever the loading bucket 23 is filled, the dump truck operator applies hydraulic pressure to the hydraulic cylinder 16 which causes the dump body 14 to tilt rearwardly from its normal or Load position shown in Fig. 1 about the pivots 15. This causes the compactor push arms 35, each composed of an upper push arm 38 and a lower push arm 39 linked together by a pivot 36 and trunnioned by trunnions 41 into a slotted hollow track 42, to pull the compactor 32 back to its retracted position as shown in Fig. 2. During the retracting of the compactor 32, the locking cams 45 maintain the lower push arms 39 in anchored relationship to the push arm anchorages 49 with the anchor pin 48 of each push arm 39 engaged below the hook 490 of each push arm anchorage 49, see Fig. 7. As the dump body 14 continues to tilt, the locking cam 45 passes out of contact with the apertured cam plate 46, and the release cam 44 engages the said cam plate 46, see Fig. 8. This causes the lower push arms 39 to move forwardly with respect to the push arm anchorages 49 and causes the anchor pins 48 to become disengaged from the push arm anchorage hooks 490, and the dump 14 may complete its rearward tilting movement to its Dump position shown in Fig. 3 without further movement of the compactor 32 or any of the compactor mechanism.

When the dump truck operator releases hydraulic pressure from the hydraulic cylinder 16, the dump body 14 pivots about the pivots 15 by gravity from its Dump position shown in Fig. 3 to its Load position shown in Fig. 1. During such downward pivoting of the dump body 14 about its pivots 15, the compactor push arms 35 are first inoperative until the dump body 14 has pivoted from the position thereof shown in Fig. 3 to the position thereof shown in Fig. 2 wherein the lower end of the lower push arms 39 contact the push arm anchorage 49. As soon as the lower push arms 39 contact the push arm anchorages 49, the compactor 32 becomes activated by the compactor push arms 35. As the dump body 14 continues its downward movement to its Load position, the release cam 44 on the rear of each lower push arm 39 becomes inoperative and the locking cam 45 on the front of each lower push arm 39 takes over and locks the lower end of each push arm 39 into a push arm anchorage 49 as indicated in Figs. 7 and 8.

As the dump truck body 14 gravitates from its Dump position to its Load position, the particular compactor mechanism and linkage disclosed employs both the weight of the dump truck body and the weight of the load therein to apply pressure on the compactor 32. Also, because of the particular arrangement of the compactor mechanism and compactor arms, the compacting force of the compactor is increased and multiplied many times as it progresses in its compacting stroke. The strike plate 34 of the compactor 32 has a combined rearward and downward action which not only strikes off garbage and/or rubbish but compacts the said garbage and/or rubbish in the forward end of the dump body on its return from its Dump position to its Load position.

Obviously, the invention may be applied to many other types of trucks than the particular truck indicated in the drawings and it is so intended. Although but one specific embodiment of the invention has been shown in the drawings and described in detail, it is obvious that many changes may be made in the size, shape, arrangement and detail of the several elements of the invention without departing from the spirit and scope thereof as defined by the appended claims.

I claim:

1. In a vehicle including a dump body pivotally supported at its rearward end and means for tilting the dump body rearwardly, a compactor transversely disposed across the upper portion of the said dump body, arms supporting the said compactor pivoted to the dump body near the bottom thereof, and compactor push arms connected to the said compactor including mechanical linkage engaging the frame of the vehicle moving the said compactor forwardly responsive to the tilting of the said dump body rearwardly from its normal position and rearwardly to compact material in the said dump body responsive to the said dump body gravitating from its tilted position to its normal position.

2. In a self loading vehicle of the type including a dump body pivoted at its rearward end, a loading bucket, means for tilting the dump body from its normal Load position to its Dump position from which it may gravitate to its normal Load position, and means for emptying the loading bucket into the dump body responsive to the tilting of the dump body to its Dump position, a compactor transversely disposed across the upper portion of the said dump body, arms supporting the said compactor pivoted to the dump body near the bottom thereof, and compactor push arms connected to the said compactor including mechanical linkage engaging the frame of the vehicle moving the said compactor forwardly responsive to the tilting of the said dump body rearwardly from its normal Load position to its Dump position to move rearwardly and compact material in the said dump body responsive to the said dump body gravitating from its Dump position to its normal Load position.

3. In a vehicle including a dump body pivotally supported at its rearward end and means for tilting the dump body rearwardly, a compactor transversely disposed across the upper portion of the said dump body, arms supporting the said compactor pivoted to the dump body near the bottom thereof, and compactor push arms connected to the said compactor each composed of a pivotally connected upper and lower push arm, guide means fixed to the front wall of the dump body into which the lower push arms may reciprocate, and means linking the said lower push arms to the vehicle frame moving the said compactor forwardly responsive to the tilting of the said dump body rearwardly from its normal position, the said lower push arms reacting against the said vehicle frame moving the said compactor rearwardly to compact material in the said dump body responsive to the said dump body gravitating from its tilted position to its normal position.

4. In a self loading vehicle of the type including a dump body pivoted at its rearward end, a loading bucket, means for tilting the dump body from its normal Load position to its Dump position from which it may gravitate to its normal Load position, and means for emptying the loading bucket into the dump body responsive to the tilting of the dump body to its Dump position, a compactor transversely disposed across the upper portion of the said dump body, arms supporting the said compactor pivoted to the dump body near the bottom thereof, and compactor push arms connected to the said compactor each composed of a pivotally connected upper and lower push arm, guide means fixed to the front wall of the dump body into which the lower push arms may reciprocate, and mechanical means linking the said lower push arms to the vehicle frame moving the said compactor forwardly responsive to the tilting of the said dump body rearwardly to its Dump position from its normal Load position, the said lower push arms engaging the vehicle frame and urging the said compactor rearwardly to compact material in the said dump body responsive to the said dump body gravitating from its Dump position to its normal Load position.

5. In a vehicle including a dump body pivotally supported at its rearward end and means for tilting the dump body rearwardly, a compactor transversely disposed across the upper portion of the said dump body having a generally vertically disposed compactor face and including a rearwardly and upwardly extending strike plate, arms supporting the said compactor pivoted to the dump body near the bottom thereof, and compactor push arms connected to the said compactor including mechanical linkage engaging the frame of the vehicle moving the said compactor forwardly responsive to the tilting of the said dump body rearwardly from its normal position striking off and compressing any material in the said dump body disposed under the said compactor, the said compactor push arms reacting against the said vehicle frame moving the said compactor rearwardly and compacting material in the said dump body responsive to the said dump body gravitating from its tilted position to its normal position.

6. In a self loading vehicle of the type including a dump body pivoted at its rearward end, a loading bucket, means for tilting the dump body from its normal Load position to its Dump position from which it may gravitate to its normal Load position, and means for emptying the loading bucket into the dump body responsive to the tilting of the dump body to its Dump position, a compactor transversely disposed across the upper portion of the said dump body having a generally vertical compactor face and including a rearwardly and upwardly extending strike plate, arms supporting the said compactor pivoted to the dump body near the bottom thereof, and compactor push arms connected to the said compactor including mechanical linkage engaging the frame of the vehicle moving the said compactor forwardly responsive to the tilting of the said dump body rearwardly from its normal Load position to its Dump position striking off and compressing any material in the said dump body disposed under the said compactor, the said compactor push arms reacting against the said vehicle frame moving the said compactor rearwardly whereby to compact material in the said dump body responsive to the said dump body gravitating from its Dump position to its normal Load position.

7. In a vehicle including a dump body pivotally supported at its rearward end and means for tilting the dump body rearwardly, a compactor transversely disposed across the upper portion of the said dump body having a generally vertical compactor face and including a rearwardly and upwardly extending strike plate, arms supporting the said compactor pivoted to the dump body near the bottom thereof, and compactor push arms connected to the said compactor each composed of a pivotally connected upper and lower push arm, guide means fixed to the front wall of the dump body into which the lower push arms may reciprocate, and means linking the said lower push arms to the vehicle frame moving the said compactor forwardly responsive to the tilting of the said dump body rearwardly from its normal position striking off and compressing diagonally downwardly any material in the said dump body disposed under the said compactor, the said lower push arms reacting against the said vehicle frame moving the said compactor rearwardly and compact material in the said dump body responsive to the said dump body gravitating from its tilted position to its normal position.

8. In a self loading vehicle of the type including a dump body pivoted at its rearward end, a loading bucket, means for tilting the dump body from its normal Load position to its Dump position from which it may gravitate to its normal Load position, and means for emptying the loading bucket into the dump body responsive to the tilting of the dump body to its Dump position, a compactor transversely disposed across the upper portion of the said dump body having a generally vertical compactor face and including a rearwardly and upwardly extending strike plate, arms supporting the said compactor pivoted to the dump body near the bottom thereof, and compactor push arms connected to the said compactor each composed of a pivotally connected upper and lower push arm, guide means fixed to the front wall of the dump body into which the lower push arms may reciprocate, and means linking the said lower push arms to the vehicle frame causing the said compactor to move forwardly responsive to the tilting of the said dump body rearwardly to its Dump position from its normal Load position striking off and compressing any material in the said dump body disposed under the said compactor, the said lower push arms engaging the vehicle frame and urging the said compactor rearwardly whereby to compact material in the said dump body responsive to the said dump body gravitating from its Dump position to its normal Load position.

9. In a vehicle including a dump body pivotally supported at its rearward end and means for tilting the dump body rearwardly, a compactor transversely disposed across the upper portion of the dump body, supporting arms rigidly secured to the said compactor pivoted to the dump body near the bottom thereof, a pair of vertically disposed hollow laterally spaced tracks secured to the front wall of the dump body having a rearwardly disposed slot therein, compactor push arms each pivotally connected to the compactor opposite one of the said hollow tracks, each compactor push arm comprising an upper push arm and a lower push arm and a pivot hingedly connecting the said upper and lower push arm together retained in the hollow track opposite thereto, the said dump body having apertures through the bottom thereof through which each lower push arm extends, and means for engaging the lower push arms to the vehicle frame causing the said compactor to move forwardly responsive to tilting the dump body rearwardly, the said lower push arms reacting against the vehicle frame responsive to the dump body gravitating from its tilted position to its normal position whereby to move the compactor rearwardly and compact material in the said dump body.

10. In a vehicle including a dump body pivotally supported at its rearward end and means for tilting the dump body rearwardly, a compactor transversely disposed across the upper portion of the dump body, supporting arms rigidly secured to the said compactor pivoted to the dump body near the bottom thereof, a pair of vertically disposed hollow laterally spaced tracks secured to the front wall of the dump body having a rearwardly disposed slot therein, compactor push arms each pivotally connected to the compactor opposite one of the said hollow tracks, each compactor push arm comprising an upper push arm and a lower push arm and a pivot hingedly connecting the said upper and lower push arm together, trunnions on said pivot retaining the said pivot in longitudinal movable relationship within the said hollow track, the said dump body having apertures through the bottom thereof through which each lower push arm extends, and means for engaging the lower push arms to the vehicle frame causing the said compactor to move forwardly responsive to tilting the dump body rearwardly, the said lower push arms reacting against the vehicle frame responsive to the dump body gravitating from its tilted position to its normal position whereby to move the compactor rearwardly and compact material in the said dump body.

11. In a vehicle including a dump body pivotally supported at its rearward end and means for tilting the dump body rearwardly, a compactor transversely disposed across the upper portion of the dump body, supporting arms rigidly secured to the said compactor pivoted to the dump body near the bottom thereof, a pair of vertically disposed hollow laterally spaced tracks secured to the front wall of the dump body having a rearwardly disposed slot therein, compactor push arms each pivotally connected to the compactor opposite one of the said hollow tracks, each compactor push arm comprising an upper push arm and a lower push arm and a pivot hingedly connecting the said upper and lower push arm together, trunnions on said pivot retaining the said pivot in longitudinal movable relationship within the said hollow track, apertured cam plates fixed to the dump body bottom over the said apertures therein, a release cam and a locking cam disposed on opposite sides of each lower push arm adapted to engage an apertured cam plate and move the lower push arm first in one direction and then the other when the dump body is tilted and lowered, an anchor disposed on the lower end of each lower push arm, and an anchorage on the vehicle frame opposite each lower push arm, the said locking and release cams serving to engage and disengage the anchor on the lower push arms with respect to the anchorages on the vehicle frame responsive to the tilting of the dump body rearwardly and the gravitating thereof from its tilted position, the said anchors at the lower ends of the lower push arms engaging the said anchorages during the initial tilting of the dump body rearwardly thereby moving the compactor forwardly to the limit of its forward movement whereupon the release cam disengages the said anchors from the said anchorages and permits the dump body to continue its tilting to the limit thereof, the said lower push arms reacting against the vehicle frame responsive to the dump body gravitating from its tilted position to its normal position whereby to move the compactor rearwardly and compact material in the said dump body whereupon the said locking cam urges the said anchors at the end of the said push arms into engagement with the said anchorages.

12. In a vehicle including a dump body pivotally supported at its rearward end and means for tilting the dump body rearwardly, a compactor transversely disposed across the upper portion of the said dump body, arms supporting the said compactor pivoted to the dump body near the bottom thereof, vertically disposed hollow tracks fixed to the dump body on the forward wall thereof, each track having a longitudinal rearwardly disposed slot therein, compactor push arms each composed of an upper push arm pivoted to the said compactor opposite a hollow track, a lower push arm, and a trunnioned pivotal connection between the said upper and lower push arms movable longitudinally within the said hollow track, the said dump body having apertures therethrough through which the said lower push arm extends, and means carried by the vehicle frame engageable by the said lower compactor push arms causing the said compactor to move forwardly responsive to the tilting of the said dump body rearwardly from its normal position, the said compactor arms reacting against the said vehicle frame responsive to the said dump body gravitating from its tilted position to its normal position causing the said compactor to move rearwardly and compact material in the said dump body.

13. In a vehicle including a dump body pivotally supported at its rearward end and means for tilting the dump body rearwardly, a compactor transversely disposed across the upper portion of the said dump body, arms supporting the said compactor pivoted to the dump body near the bottom thereof, vertically disposed hollow tracks fixed to the dump body on the forward wall thereof, each track having a longitudinal rearwardly disposed slot therein, compactor push arms each composed of an upper push arm pivoted to the said compactor opposite a hollow track, a lower push arm, and a trunnioned pivotal connection between the said upper and lower push arms movable longitudinally within the said hollow track, the said dump body having apertures therethrough through which the said lower push arms extend, an apertured cam plate fixed to the dump body bottom at the said apertures therein, a release cam and a locking cam disposed on opposite sides of each lower push arm, an anchor on the lower end of each lower push arm, and anchorages carried by the vehicle frame engageable by the said lower compactor push arms responsive to the action of the locking cams causing the said compactor to move forwardly responsive to the initial tilting of the said dump body rearwardly from its normal position after which the release cams release the said anchors from the said anchorages permitting the said dump body to continue tilting rearwardly without further movement of the said compactor, the said compactor arms engaging the said vehicle frame responsive to the said dump body gravitating from its tilted position to its normal position causing the release cams to become inoperative and the locking cams to move the anchors on the end of the lower push rod again in engagement with the anchorages and causing the said compactor to move rearwardly and compact material in the said dump body.

14. In a vehicle including a dump body pivotally supported at its rearward end and means for tilting the dump body rearwardly, a compactor transversely disposed across the upper portion of the said dump body, arms supporting the said compactor pivoted to the dump body near the bottom thereof, and compactor push arms connected to the said compactor each composed of a pivotally connected upper and lower push arm, guide means fixed to the front wall of the dump body into which the lower push arms may reciprocate, means anchoring the said lower push arms to the vehicle frame causing the said compactor to move forwardly responsive to the tilting of the said dump body rearwardly from its normal position, the said lower push arm reacting against the said vehicle frame causing the said compactor to move rearwardly and compact material in the said dump body responsive to the said dump body gravitating from its tilted position to its normal position, and cam means on the said lower push arms causing the said anchoring means to engage and disengage the said vehicle frame during the said tilting of the dump body and the gravitating thereof.

15. In a self loading vehicle of the type including a dump body pivoted at its rearward end, a loading bucket, means for tilting the dump body from its normal Load position to its Dump position from which it may gravitate to its normal Load position, and means for emptying the loading bucket into the dump body responsive to the tilting of the dump body to its Dump position, a compactor transversely disposed across the upper portion of the said dump body, arms supporting the said compactor pivoted to the dump body near the bottom thereof, and compactor push arms connected to the said compactor each composed of a pivotally connected upper and lower push arm, guide means fixed to the front wall of the dump body into which the lower push arms may reciprocate, means anchoring the said lower push arms to the vehicle frame causing the said compactor to move forwardly responsive to the tilting of the said dump body rearwardly to its Dump position from its normal Load position, the said lower push arms engaging the vehicle frame and urging the said compactor rearwardly whereby to compact material in the said dump body responsive to the said dump body gravitating from its Dump position to its normal Load position, and cam means on the said lower push arms causing the said anchoring means to engage and disengage the said vehicle frame during the said tilting of the dump body and the gravitating thereof.

16. In a vehicle including a dump body pivotally supported at its rearward end and means for tilting the dump body rearwardly, a compactor transversely disposed across the upper portion of the said dump body having a generally vertically disposed compactor face and including a rearwardly and upwardly extending strike plate, means supporting said compactor permitting forward and rearward movement thereof, and compactor push arms connected to the said compactor including mechanical linkage engaging the frame of the vehicle moving the said compactor forwardly responsive to the tilting of the said dump body rearwardly from its normal position striking off and compressing any material in the said dump body disposed under the said compactor, the said compactor push arms reacting against the said vehicle frame moving the said compactor rearwardly and compacting material in the said dump body responsive to the said dump body gravitating from its tilted position to its normal position.

17. In a self loading vehicle of the type including a dump body pivoted at its rearward end, a loading bucket, means for tilting the dump body from its normal Load position to its Dump position from which it may gravitate to its normal Load position, and means for emptying the loading bucket into the dump body responsive to the tilting of the dump body to its Dump position, a compactor transversely disposed across the upper portion of the said dump body having a generally vertical compactor face and including a rearwardly and upwardly extending strike plate, means supporting said compactor permitting forward and rearward movement thereof, and compactor push arms connected to the said compactor each composed of a pivotally connected upper and lower push arm, guide means fixed to the front wall of the dump body into which the lower push arms may reciprocate, and means linking the said lower push arms to the vehicle frame causing the said compactor to move forwardly responsive to the tilting of the said dump body rearwardly to its Dump position from its normal Load position striking off and compressing any material in the said dump body disposed under the said compactor, the said lower push arms engaging the vehicle frame and urging the said compactor rearwardly whereby to compact material in the said dump body responsive to the said dump body gravitating from its Dump position to its normal Load position.

18. In a vehicle including a dump body pivotally supported at its rearward end and means for tilting the dump body rearwardly, a compactor transversely disposed across the upper portion of the said dump body, means supporting said compactor permitting forward and rearward movement thereof, vertically disposed hollow tracks fixed to the dump body on the forward wall thereof, each track having a longitudinal rearwardly disposed slot therein, compactor push arms each composed of an upper push arm pivoted to the said compactor opposite a hollow track, a lower push arm, and a trunnioned pivotal connection between the said upper and lower push arms movable longitudinally within the said hollow track, the said dump body having apertures therethrough through which the said lower push arm extends, and means carried by the vehicle frame engageable by the said lower compactor push arms causing the said compactor to move forwardly responsive to the tilting of the said dump body rearwardly from its normal position, the said compactor arms reacting against the said vehicle frame responsive to the said dump body gravitating from its tilted position to its normal position causing the said compactor to move rearwardly and compact material in the said dump body.

GEORGE B. WOOD.

REFERENCES CITED

The following references are of record in the file of this patent:

UNITED STATES PATENTS

| Number | Name | Date |
|---|---|---|
| 2,256,042 | Boone et al. | Sept. 16, 1941 |
| 2,260,947 | Leach et al. | Oct. 28, 1941 |
| 2,380,917 | Boone | Aug. 7, 1945 |

FOREIGN PATENTS

| Number | Country | Date |
|---|---|---|
| 628,189 | Germany | Mar. 30, 1936 |